US012574554B2

(12) United States Patent
Skupin et al.

(10) Patent No.: US 12,574,554 B2
(45) Date of Patent: Mar. 10, 2026

(54) VIDEO CODING CONCEPT FOR HANDLING OF MOTION-VECTORS IN STREAMING SCENARIOS

(71) Applicant: FRAUNHOFER-GESELLSCHAFT ZUR FÖRDERUNG DER ANGEWANDTEN FORSCHUNG E.V., Munich (DE)

(72) Inventors: Robert Skupin, Berlin (DE); Christian Bartnik, Berlin (DE); Adam Wieckowski, Berlin (DE); Yago Sánchez De La Fuente, Berlin (DE); Cornelius Hellge, Berlin (DE); Benjamin Bross, Berlin (DE); Thomas Schierl, Berlin (DE); Thomas Wiegand, Berlin (DE); Detlev Marpe, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 144 days.

(21) Appl. No.: 18/293,081

(22) PCT Filed: Aug. 5, 2022

(86) PCT No.: PCT/IB2022/057331
§ 371 (c)(1),
(2) Date: Jan. 29, 2024

(87) PCT Pub. No.: WO2023/021362
PCT Pub. Date: Feb. 23, 2023

(65) Prior Publication Data
US 2024/0340455 A1     Oct. 10, 2024

(30) Foreign Application Priority Data

Aug. 18, 2021     (EP) ..................................... 21192028

(51) Int. Cl.
*H04N 19/00* (2014.01)
*H04N 19/159* (2014.01)
(Continued)

(52) U.S. Cl.
CPC ........... *H04N 19/70* (2014.11); *H04N 19/159* (2014.11); *H04N 19/513* (2014.11); *H04N 19/59* (2014.11)

(58) Field of Classification Search
CPC ..................................................... H04N 19/00
See application file for complete search history.

(56) References Cited

U.S. PATENT DOCUMENTS

2017/0078703 A1* 3/2017 Ridge .................. H04N 19/184
2019/0349598 A1* 11/2019 Aminlou .............. H04N 19/105

OTHER PUBLICATIONS

Brian Heng et al., "AHG16/AHG8: Proposed Cleanup for Reference Wraparound" Joint Video Experts Team (JVET) of ITU-T SG 16 WP 3 and ISO/IEC JTC 1/SC 29/WG, Document: JVET-N0070-v2, Mar. 19-27, 2019, 8 pages.
(Continued)

*Primary Examiner* — Maryam A Nasri
(74) *Attorney, Agent, or Firm* — Sage Patent Group

(57) ABSTRACT

A motion-vector wrap-around coding tool may be reliably used, for instance, in the context of segmental video bitstream formation under switching between different video bitstream representations. A video encoder encodes a video and an indication into a data stream, which is valid for a sequence of pictures, and indicates that certain or all Random Access Skipped Leading (RASL) pictures within the sequence of pictures are coded in a manner excluding a predetermined set of one or more coding tools which includes a wrap-around motion compensation tool. A video decoder decodes from a data stream an indication that indicates that certain or all RASL pictures within a sequence
(Continued)

of pictures are coded in a manner excluding a predetermined set of one or more coding tools including a wrap-around motion compensation tool.

16 Claims, 9 Drawing Sheets

(51) Int. Cl.
  *H04N 19/513*       (2014.01)
  *H04N 19/59*        (2014.01)
  *H04N 19/70*        (2014.01)

(56)                   References Cited

OTHER PUBLICATIONS

Benjamin Bross et al., "Versatile Video Coding (Draft 7)" Joint Video Experts Team (JVET) of ITU-T SG 16 WP 3 and ISO/IEC JTC 1/SC 29/WG 11, Document: JVET-P2001-vE, 16th Meeting: Geneva, CH, Oct. 1-11, 2019, 488 pages.
Robert Skupin et al., "AHG9: On the Crei Sei message", Joint Video Experts Team (JVET) of ITU-T SG 16 WP 3 and ISO/IEC JTC 1/SC 29, 24rd Meeting, Document: JVET-X0101, Oct. 1, 2021, 6 pages, retrieved from the Internet: URL:https://jvet-experts.org/doc_end_user/documents/24_Teleconference/wgll/JVET-X010 1-vl.zip.
Robert Skupin et al., "Constrained RASL encoding for bitstream switching", Joint Video Experts Team (JVET) of ITU-T SG 16 WP 3 and ISO/IEC JTC 1/SC 29, 23rd Meeting, Document: JVET-W0133-v2, Jul. 15, 2021, 7 pages, retrieved from the Internet: URL:https://jvet-experts.org/doc_end_user/ documents/23_Teleconference/wgll/JVET- W013 3-v3.zip.
Byeongdoo Choi et al., "AHG9: On wrap around motion compensation", Joint Video Experts Team (JVET) of ITU-T SG 16 WP 3 and ISO/IEC JTC 1/SC 29/WG 11, 17th Meeting: Brussles, BE, Document: JVET-Q0287, Jan. 1, 2021, 4 pages, retrieved from the Internet: URL:http://phenix.int-evry.fr/jvet/doc_end_user/documents/17_Brussels/wgll/JVET-Q028 7-vl.zip.
Jianle Chen et al., "Algorithm description for Versatile Video Coding and Test Model 13 (VTM 13)", Joint Video Experts Team (JVET) of Itu-T Sg 16 WP 3 and ISO/IEC JTC 1/SC 29, 22nd Meeting, Document: JVET-V2002-v1, Jul. 7, 2021, 103 pages, retrieved from the Internet: URL:https://dms.mpeg. expert/doc_end_user/documents/134_OnLine/wgll/MDS20241_WG05_N00 056.zip.
Robert Skupin et al., "Constrained RASL encoding for bitstream switching", Joint Video Experts Team (JVET) of ITU-T SG 16 WP 3 and ISO/IEC JTC 1/SC 29, 22nd Meeting, Document: JVET-V0060-v1, Apr. 23, 2021, 6 pages, retrieved from the Internet: URL:https://jvet-experts.org/doc_end_user/ documents/22_Teleconference/wgll/JVET-V006 0-v2.zip.
International Search Report for PCT/IB2022/057331, mailed Jan. 10, 2023, 6 pages.
Written Opinion of the ISA for PCT/IB2022/057331, mailed Jan. 10, 2023, 13 pages.
Chen, et al. "Algorithm description for Versatile Video Coding and Test Model 13 (VTM 13)," JVET-V2002-v1, 22nd Meeting, by teleconference, Apr. 20-28, 2021, 102 pages.

* cited by examiner

VIDEO CODING CONCEPT FOR HANDLING OF MOTION-VECTORS IN STREAMING SCENARIOS

CROSS-REFERENCE TO RELATED APPLICATIONS

This application is the U.S. national phase of International Application No. PCT/IB2022/057331 filed Aug. 5, 2022, which designated the U.S. and claims priority to EP 21192028.5 filed Aug. 18, 2021, the entire contents of each of which are hereby incorporated by reference.

Embodiments of the present application relate to video bitstreams, video encoders, video decoders, methods for encoding a video sequence into a video bitstream, and methods for decoding a video sequence from a video bitstream. Further embodiments relate handling motion vectors, motion vector wrap-around, and/or open GOP stream switching in 360-degree video streaming.

In 360-degree video or omnidirectional video, some projection formats such as the equirectangular projection (ERP) have the property that depicted objects moving towards and passing one vertical picture boundary over time, enter the picture plane on the opposite vertical picture boundary again. In VVC, motion compensated prediction mode, referred to as wrap-around motion compensation, can be used to utilize this property of the projection format in order to increase coding efficiency. This is archived by allowing motion vectors to fully or partially wrap around the vertical picture boundaries (or some other defined vertical position within the picture) and offer enhanced prediction block signals, e.g. a compound prediction signal from sample positions from both picture boundaries at once. FIG. 6 shows an illustration of the principle of wrap-around motion compensation where the position of a current block (solid line) and the position of its reference block (dashed lines) are depicted. It can be seen that samples of the reference block are partially located outside the right picture boundary in which case samples from the left picture boundary are used to generate the prediction signal.

For example, such 360 degree video streaming scenarios may be realized by HTTP streaming. HTTP streaming of coded video has become an important path of video distribution over the last decade and OTT service providers can reach hundreds of millions of users via the public internet today. Standard protocols such as Dynamic Adaptive Streaming over HTTP (DASH) enable a service provider to stream media to clients by having a server offering the media at various bitrates in a temporally segmented form. A client device is then able to download successive segments for continuous playback by selecting amongst the offered variants of a particular segment according to the available network bandwidth and its decoding capabilities in a dynamic and adaptive fashion. In practice, the content is offered as multiple so-called representations generated by optimized bitrate ladders, which often involve multiple resolutions and fidelities in order to optimize the perceived quality for a particular bitrate and thereby user experience. Since each segment is typically coded without dependencies to earlier segments using so-called closed Group-Of-Pictures (GOP) coding structures, the downloaded and depacketized segment data can be concatenated to a conforming bitstream and fed into a decoder. Opposed to such closed GOP structures, segments using so-called open GOP coding structures contain some pictures that employ inter-prediction from pictures in earlier segments which benefits coding efficiency. While the pictures using inter-prediction from earlier segments can be skipped from being output without playback issues or visual artefacts when random accessing a segment as they come first in presentation order, an issue arises when a resolution switch occurs during continuous playout as these pictures are skipped at such a non-seamless switch. Even in pure bitrate switching some pictures may be dropped or exhibit severe visual artefacts when segments are not encoded properly for switching.

In a further example of a streaming scenario, different parts of the 360 degree video such as the ERP are provided at different resolutions, aiming for providing a portion which a user is probable to consume at a high quality, while providing other parts at a lower quality intended as fallback option, only. That way, the amount of data which has to be streamed may be reduced. Also in this scenario, the resolution of the pictures provided to the decoder may vary.

Proliferated earlier generation codecs such as AVC and HEVC do not offer reference picture resampling (RPR) functionality required to use reference pictures of different resolution. Therefore, after resolution switching, when performed at such open GOP structures, some pictures of a segment cannot be correctly decoded as reference pictures from earlier segments are not available in the required resolution which results in non-constant frame rate playout at the segment switch from dropped pictures. Some approaches to overcome the issue of open GOP resolution switching include employing normative changes to the HEVC decoding process or using the less proliferated scalable extension of HEVC (SHVC) that offers RPR functionality. However, these approaches currently do not enable substantial adoption of open GOP coding in HTTP streaming.

A recent version 1 of the Versatile Video Coding (VVC) standard is the latest video coding standard that emerged from the collaborative work of the Video Coding Expert Group of ITU-T and the Sub Committee 29 of ISO/IEC also known as Moving Picture Experts Group. Aside offering substantially increased coding efficiency compared to earlier generation codecs, VVC also includes many application-driven features in the initial Main 10 profile such as RPR. During VVC development, RPR was mainly investigated in the context of conversational scenarios with low-delay coding structures where real-world requirements on latency and buffer sizes set tight limits for the feasibility of insertion of intra coded pictures for resolution switching.

However, RPR in VVC can also provide substantial benefit to coding efficiency in video encoding for the streaming domain.

It would be favorable to have a concept at hand which enables a reliable handling of motion-vectors, and in particular a reliable handling of motion-vector wrap-around in streaming scenarios. In particular, it would be favorable have a concept for handling motion-vector wrap-around in the context of open GOP resolution switching in HTTP streaming using codecs such as VVC Thus, it is an object to provide a video coding concept which enables a reliable usage of a motion-vector wrap-around coding tool, for instance, in the context of segmental video bitstream formation under switching between different video bitstream representations.

This object is achieved by the subject-matter of the independent claims of the present application. Advantageous aspects of the present application are the subject of dependent claims. Example embodiments of the present application are described below with respect to the figures.

In the following, embodiments are discussed in detail, however, it should be appreciated that the embodiments provide many applicable concepts that can be embodied in a wide variety of video coding concepts. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same reference numbers or being identified with the same names are mutually exchangeable or may be applied to one another in the different embodiments.

The following description of the figures starts with a presentation of a description of an encoder and a decoder of a block-based predictive codec for coding pictures of a video in order to form an example for a coding framework into which embodiments may be built in. The respective encoder and decoder are described with respect to FIGS. 1 to 3. Thereinafter the description of example embodiments is presented along with a description as to how such concepts could be built into the encoder and decoder of FIGS. 1 and 2, respectively, although the embodiments described with the subsequent FIGS. 4 and following, may also be used to form encoders and decoders not operating according to the coding framework underlying the encoder and decoder of FIGS. 1 and 2.

Figure 1:
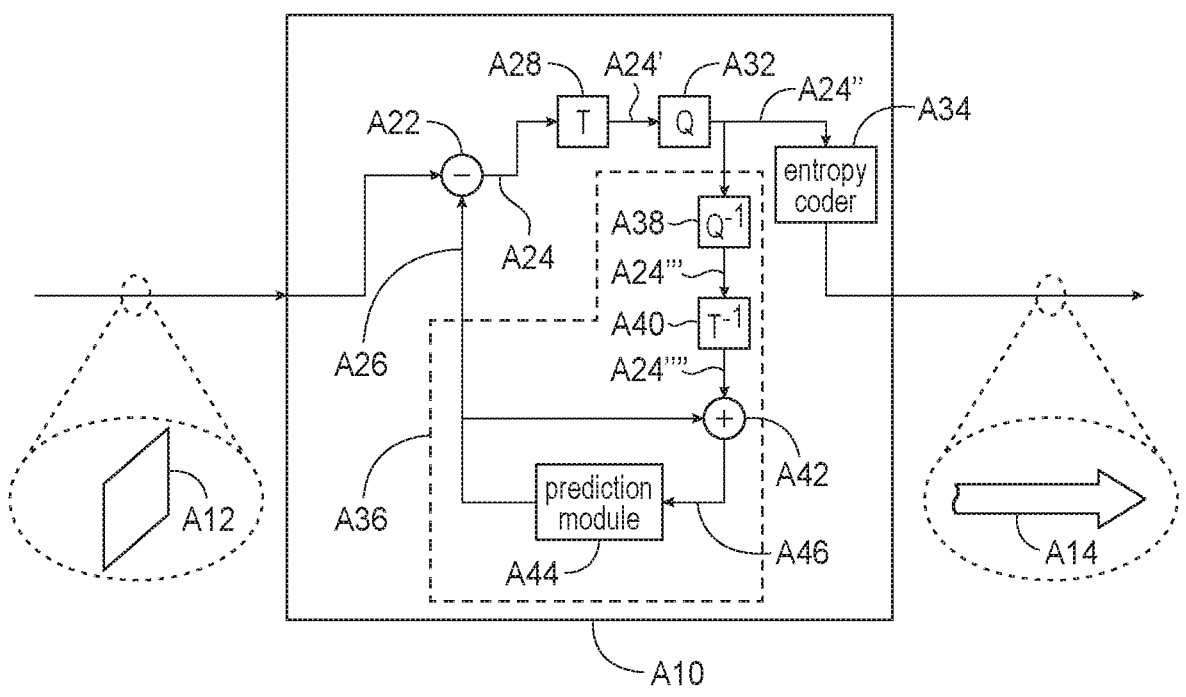
FIG. 1 shows an apparatus for predictively coding a picture into a data stream using for example transform-based residual coding.
Figure 2:
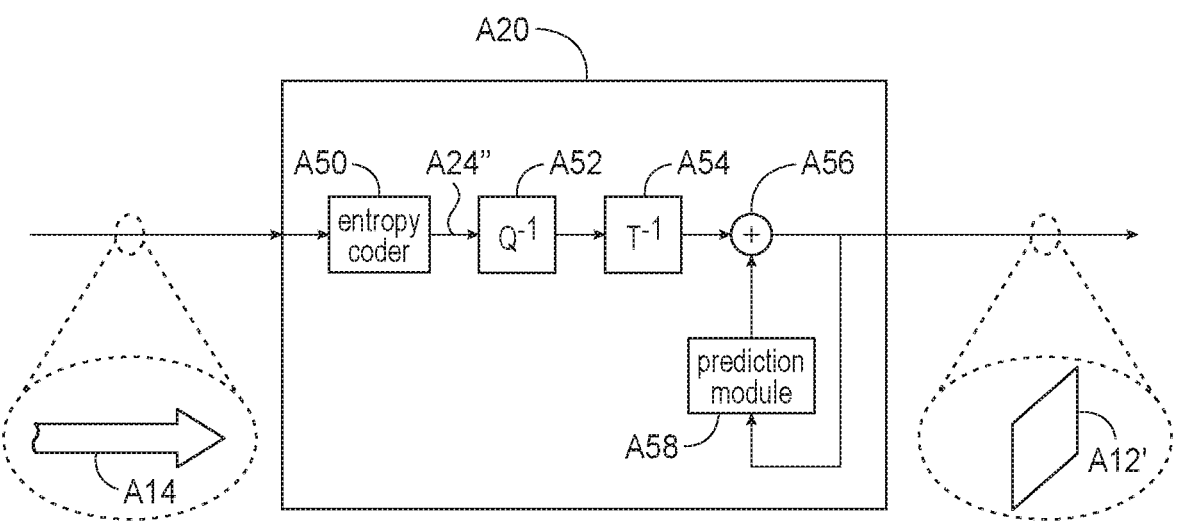
FIG. 2 shows a corresponding decoder.

FIG. 1 shows an apparatus for predictively coding a picture A12 into a data stream A14 exemplarily using transform-based residual coding. The apparatus, or encoder, is indicated using reference sign A10. FIG. 2 shows a corresponding decoder A20, i.e. an apparatus A20 configured to predictively decode the picture A12' from the data stream A14 also using transform-based residual decoding, wherein the apostrophe has been used to indicate that the picture A12' as reconstructed by the decoder A20 deviates from picture A12 originally encoded by apparatus A10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder A10 is configured to subject the prediction residual signal to spatial-to-spectral transformation and to encode the prediction residual signal, thus obtained, into the data stream A14. Likewise, the decoder A20 is configured to decode the prediction residual signal from the data stream A14 and subject the prediction residual signal thus obtained to spectral-to-spatial transformation.

Internally, the encoder A10 may comprise a prediction residual signal former A22 which generates a prediction residual A24 so as to measure a deviation of a prediction signal A26 from the original signal, i.e. from the picture A12. The prediction residual signal former A22 may, for instance, be a subtractor which subtracts the prediction signal from the original signal, i.e. from the picture A12. The encoder A10 then further comprises a transformer A28 which subjects the prediction residual signal A24 to a spatial-to-spectral transformation to obtain a spectral-domain prediction residual signal A24' which is then subject to quantization by a quantizer A32, also comprised by the encoder A10. The thus quantized prediction residual signal A24" is coded into bitstream A14. To this end, encoder A10 may optionally comprise an entropy coder A34 which entropy codes the prediction residual signal as transformed and quantized into data stream A14. The prediction signal A26 is generated by a prediction stage A36 of encoder A10 on the basis of the prediction residual signal A24" encoded into, and decodable from, data stream A14. To this end, the prediction stage A36 may internally, as is shown in FIG. 1, comprise a dequantizer A38 which dequantizes prediction residual signal A24" so as to gain spectral-domain prediction residual signal A24''', which corresponds to signal A24' except for quantization loss, followed by an inverse transformer A40 which subjects the latter prediction residual signal A24''' to an inverse transformation, i.e. a spectral-to-spatial transformation, to obtain prediction residual signal A24'''', which corresponds to the original prediction residual signal A24 except for quantization loss. A combiner A42 of the prediction stage A36 then recombines, such as by addition, the prediction signal A26 and the prediction residual signal A24'''' so as to obtain a reconstructed signal A46, i.e. a reconstruction of the original signal A12. Reconstructed signal A46 may correspond to signal A12'. A prediction module A44 of prediction stage A36 then generates the prediction signal A26 on the basis of signal A46 by using, for instance, spatial prediction, i.e. intra-picture prediction, and/or temporal prediction, i.e. inter-picture prediction.

Likewise, decoder A20, as shown in FIG. 2, may be internally composed of components corresponding to, and interconnected in a manner corresponding to, prediction stage A36. In particular, entropy decoder A50 of decoder A20 may entropy decode the quantized spectral-domain prediction residual signal A24'' from the data stream, whereupon dequantizer A52, inverse transformer A54, combiner A56 and prediction module A58, interconnected and cooperating in the manner described above with respect to the modules of prediction stage A36, recover the reconstructed signal on the basis of prediction residual signal A24'' so that, as shown in FIG. 2, the output of combiner A56 results in the reconstructed signal, namely picture A12'.

Although not specifically described above, it is readily clear that the encoder A10 may set some coding parameters including, for instance, prediction modes, motion parameters and the like, according to some optimization scheme such as, for instance, in a manner optimizing some rate and distortion related criterion, i.e. coding cost. For example, encoder A10 and decoder A20 and the corresponding modules A44, A58, respectively, may support different prediction modes such as intra-coding modes and inter-coding modes. The granularity at which encoder and decoder switch between these prediction mode types may correspond to a subdivision of picture A12 and A12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture A12 belongs, at which the previously coded/decoded picture is sampled in order to obtain the prediction signal for the respective inter-coded block. This means, in addition to the residual signal coding comprised by data stream A14, such as the entropy-coded transform coefficient levels representing the quantized spectral-domain prediction residual signal A24'', data stream A14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture A12 and A12', respectively, into the segments. The decoder A20 uses these parameters to sub-divide the picture in the same manner as the encoder did, to assign the same prediction modes to the segments, and to perform the same prediction to result in the same prediction signal.

Figure 3:
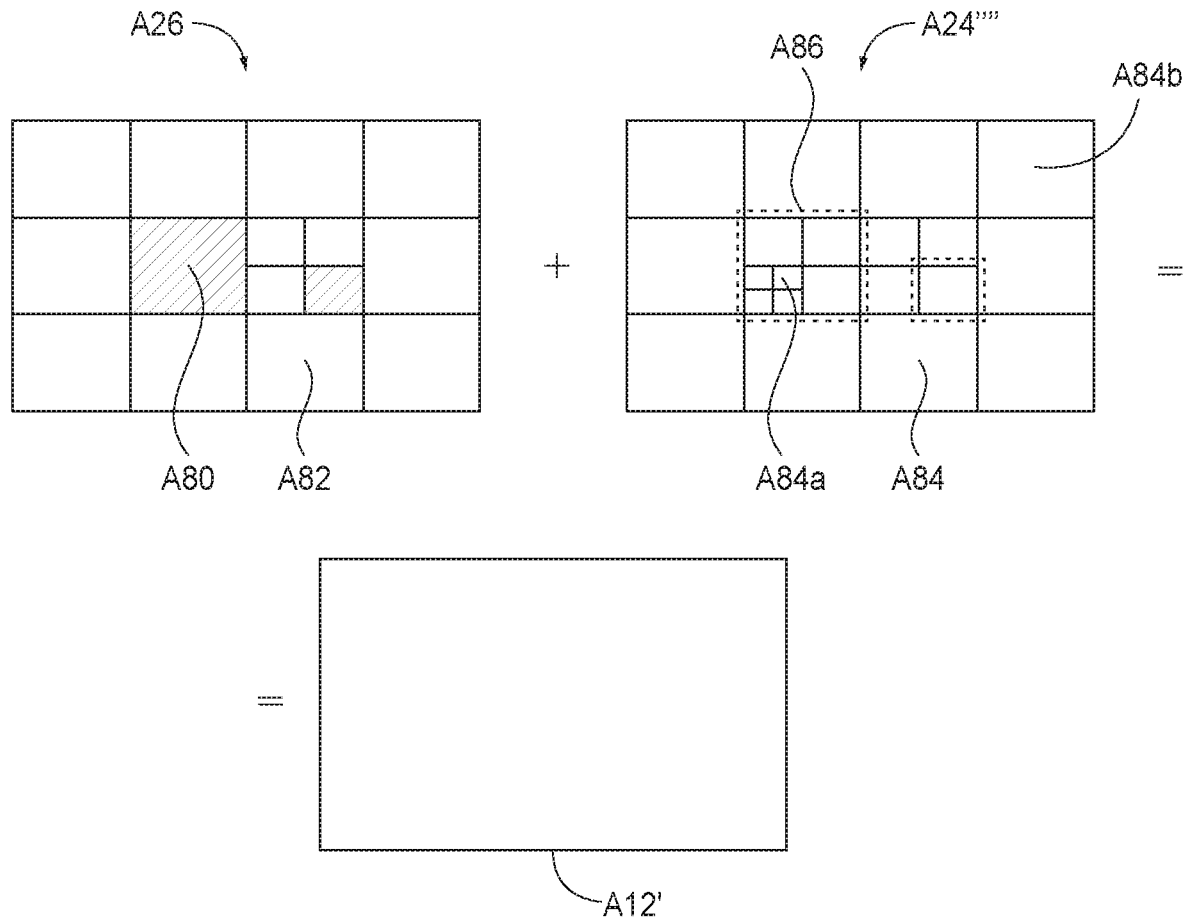
FIG. 3 illustrates a relationship between a reconstructed signal and a combination of a prediction residual signal as signaled in the data stream and the prediction signal.

FIG. 3 illustrates the relationship between the reconstructed signal, i.e. the reconstructed picture A12', on the one hand, and the combination of the prediction residual signal A24'''' as signaled in the data stream A14, and the prediction signal A26, on the other hand. As already denoted above, the combination may be an addition. The prediction signal A26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture A12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream A14 may have an intra-coding mode coded thereinto for intra-coded blocks A80, which assigns one of several supported intra-coding modes to the respective intra-coded block A80. For inter-coded blocks A82, the data stream A14 may have one or more motion parameters coded thereinto. Generally speaking, inter-coded blocks A82 are not restricted to being temporally coded. Alternatively, inter-coded blocks A82 may be any block predicted from previously coded portions beyond the current picture A12 itself, such as previously coded pictures of a video, e.g. a view or layer, to which picture A12 belongs, or picture of another view or an hierarchically lower layer in the case of encoder and decoder being scalable encoders and decoders, respectively.

The prediction residual signal A24'''' in FIG. 3 is also illustrated as a subdivision of the picture area into blocks A84. These blocks might be called transform blocks in order to distinguish same from the coding blocks A80 and A82. In effect, FIG. 3 illustrates that encoder A10 and decoder A20 may use two different subdivisions of picture A12 and picture A12', respectively, into blocks, namely one subdivisioning into coding blocks A80 and A82, respectively, and another subdivision into transform blocks A84. Both subdivisions might be the same, i.e. each coding block A80 and A82, may concurrently form a transform block A84, but FIG. 3 illustrates the case where, for instance, a subdivision into transform blocks A84 forms an extension of the subdivision into coding blocks A80, A82 so that any border between two blocks of blocks A80 and A82 overlays a border between two blocks A84, or alternatively speaking each block A80, A82 either coincides with one of the transform blocks A84 or coincides with a cluster of transform blocks A84. However, the subdivisions may also be determined or selected independent from each other so that transform blocks A84 could alternatively cross block borders between blocks A80, A82. As far as the subdivision into transform blocks A84 is concerned, similar statements are thus true as those brought forward with respect to the subdivision into blocks A80, A82, i.e. the blocks A84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks A80, A82 and A84 are not restricted to being of quadratic, rectangular or any other shape. FIG. 3 further illustrates that the combination of the prediction signal A26 and the prediction residual signal A24″″ directly results in the reconstructed signal A12'. However, it should be noted that more than one prediction signal A26 may be combined with the prediction residual signal A24″″ to result into picture A12' in accordance with alternative embodiments.

In FIG. 3, the transform blocks A84 shall have the following significance. Transformer A28 and inverse transformer A54 perform their transformations in units of these transform blocks A84. For instance, many codecs use some sort of DST or DCT for all transform blocks A84. Some codecs allow for skipping the transformation so that, for some of the transform blocks A84, the prediction residual signal is coded in the spatial domain directly. However, in accordance with embodiments described below, encoder A10 and decoder A20 are configured in such a manner that they support several transforms. For example, the transforms supported by encoder A10 and decoder A20 could comprise:

DCT-II (or DCT-III), where DCT stands for Discrete Cosine Transform

DST-IV, where DST stands for Discrete Sine Transform

DCT-IV

DST-VII

Identity Transformation (IT)

Naturally, while transformer A28 would support all of the forward transform versions of these transforms, the decoder A20 or inverse transformer A54 would support the corresponding backward or inverse versions thereof:

Inverse DCT-II (or inverse DCT-III)

Inverse DST-IV

Inverse DCT-IV

Inverse DST-VII

Identity Transformation (IT)

The subsequent description provides more details on which transforms could be supported by encoder A10 and decoder A20. In any case, it should be noted that the set of supported transforms may comprise merely one transform such as one spectral-to-spatial or spatial-to-spectral transform.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture A12 using the concept outlined in more detail below and being different from the encoder of FIG. 1 such as, for instance, in that the sub-division into blocks A80 is performed in a manner different than exemplified in FIG. 3. Likewise, decoders according to embodiments of the present application may perform block-based decoding of picture A12' from data stream A14 using the coding concept further outlined below, but may differ, for instance, from the decoder A20 of FIG. 2 in that same does not support intra-prediction, or in that same sub-divides picture A12' into blocks in a manner different than described with respect to FIG. 3 and/or in that same does not derive the prediction residual from the data stream A14 in transform domain, but in spatial domain, for instance.

As discussed, FIGS. 1 to 3 where merely meant to provide a rough outline of a video codec on which the subsequently outlined embodiments of the present application may be based. VVC, for instance, is an example for a video codec which the video decoder and the video encoder of FIGS. 1 and 2 may be tailored to.

The following description is structured as follows. Preliminarily, VVC is used as an example for a video codec environment and, based on this example, the following description provides a report on experiments investigating the general coding efficiency impact of open GOP coding structures as well as the picture quality impact at segment switches. Again, the embodiments described later on are not restricted to VVC, and the coding tools discussed with respect to these embodiments are not restricted to those discussed with respect to VVC, but the presentation of these experiments and the outcome thereof provides a motivation which led to the embodiments described later on. Further, the subsequent description will provide an overview of GOP coding structures and segmentation with then presenting a constrained encoding to enable open GOP switching, such as open GOP resolution switching, with effectively limiting drift associated with the switching. Thereinafter, several embodiments of the present application are presented which emerged from the considerations regarding VVC.

The following provides an overview of structures within a VVC bitstream and media segmentation for streaming. Media segments are generally aligned with intra random access point (IRAP) pictures using intra coding tools only. IRAP pictures may appear frequently in a coded video bitstream to allow functionalities such as seeking or fast forwarding, but also to serve as switching points for adaptive HTTP streaming. Systems for Video on Demand (VoD) streaming typically align segments with IRAP picture periods, i.e., IRAP pictures are typically placed at the segment start and the desired segment duration determines the temporal distance between IRAP pictures. However, there are use-cases, e.g., very low delay streaming, in which not all media segments contain an IRAP picture, so that small segments can be made available for transmission without needing to wait for an IRAP picture and thus reduce the latency at the content generation side. Segment sizes may vary in length depending on the target application. For instance, VoD services allow players to build larger buffers (e.g., 30 seconds) to overcome throughput fluctuations for which segment sizes up to several seconds (e.g. 5 seconds) can be one possible approach. However, live services that require more stringent end-to-end delays do not allow such large buffers at the client side and hence require more frequent switching points and shorter segments of 1 second or less.

Figure 4:
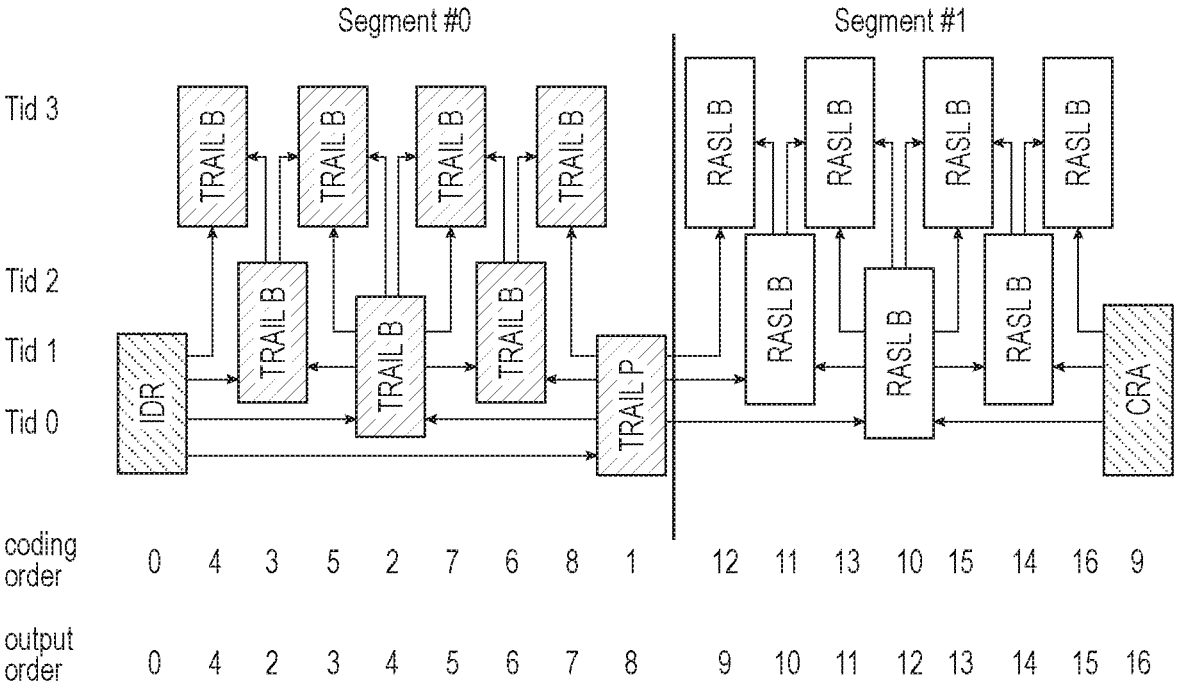
FIG. 4 illustrates an example of a hierarchy structure of a GOP used for temporal scalability in which decoding all pictures up to a given layer correspond to a given framerate and a corresponding Temporal Id (Tid) value is assigned to each picture for a GOP size of 8 pictures.

Pictures between two IRAP pictures are typically encoded in a bi-predicted hierarchical GOP structure involving reordering before presentation as far as decoding delay requirements allow because such a structure provides substantial coding efficiency benefit as introduced in AVC. The hierarchy structure of a GOP can be used for temporal scalability in which decoding all pictures up to a given layer correspond to a given framerate and a corresponding Temporal Id (Tid) value is assigned to each picture as shown in FIG. 4 for a GOP size of 8 pictures. A GOP can be defined as all pictures from a first Tid 0 picture up to but not including the following Tid 0 picture in decoding order. Typically, segments include one or more GOP structures depending on IRAP period and GOP size. While in HEVC, the amount of reference picture slots in the Decoded Picture Buffer (DBP)

allowed typical GOP sizes of 16 pictures, DPB capacity was increased in VVC allowing hierarchical GOP sizes of up to 32 pictures.

Pictures following an IRAP picture in decoding order but preceding it in presentation order are introduced in HEVC and referred to as leading pictures. They can be further distinguished into Random Access Skipped Leading (RASL) and Random Access Decodable Leading (RADL). While RADL pictures may only use reference picture from the IRAP picture onwards in decoding order, RASL pictures may use reference pictures preceding the IRAP in addition. IRAP pictures of the Instantaneous Random Access (IDR) type reset the DBP and can only have leading pictures that are RADL pictures leading to so-called closed GOP structures. Further IRAP pictures of the Clean Random Access (CRA) type, on the other hand, do not reset the DPB. Hence, reconstructed pictures from before the CRA in decoding order are available as reference for future pictures, i.e. the RASL pictures allowing for so-called open GOP coding structures. RASL pictures exhibit an increased coding efficiency compared to RADL pictures but can be rendered undecodable when reference pictures are not available, e.g. during a random access at the associated IRAP at the beginning of a segment without decoding the previous segment. A more detailed overview of VVC high-level syntax can be found in Y.-K. Wang et al., "The High-Level Syntax of the Versatile Video Coding (VVC) Standard," IEEE Trans. Circuits Syst. Video Technol., in press.

FIG. 4 illustrates, for instance, a formation of a video data stream out of a concatenation of two successive segments with different resolution in which the second segment employs an open GOP coding structure with reference pictures from the first segment. In particular, referenced reference pictures are those rectangles in FIG. 4 from which arrows emerge. The arrows themselves illustrates the prediction interdependencies, i.e., they point from a reference picture to the referencing picture. Each picture is associated with a certain temporal ID Tid and, as can be seen, the coding order deviates from the output/presentation order of the pictures. As can be seen, the pictures of output order rank 9 to 15 are RASL pictures which, directly or indirectly, reference the CRA picture of the own segment, segment 1, they belong to, as well as a picture stemming from the previous segment, segment 0, mainly the picture having output order rank 8.

When the reference pictures of a RASL picture are located in the previous segment and the streaming client switches representations after such a previous segment, the client decoder, which receives the bitstream downloaded and composed by the client, will decode the RASL picture using a different variant of at least part of the reference pictures compared to encoder side. Such a situation can lead to a non-conforming bitstream if the content is not generated appropriately or to significant mismatches in the reconstructed RASL pictures and this drift may propagate to all RASL pictures up to but not including the associated CRA picture. In the following, an appropriate generation of content is discussed which allows using open GOP structures while maintaining bitstream conformance at segment switches and avoiding undesirable drift that would be detrimental to visual quality during switches.

For example, the two segments illustrated in FIG. 4 may be part of a sequence of picture of the video coded into the data stream. The sequence of picture may for example be a coded video sequence (CVS). The pictures of the sequence of pictures may be consecutive in coding order. The sequence of picture may a start with an IRAP picture, e.g. an IDR or a CRA picture. The sequence of pictures may end with a picture which directly precedes the first picture of a consecutive sequence of pictures in coding order, i.e. with a picture directly preceding an IDR or a CRA picture. In the latter case, the last picture may be indicated, in the bitstream, to be an end-of-sequence picture.

Figure 5:
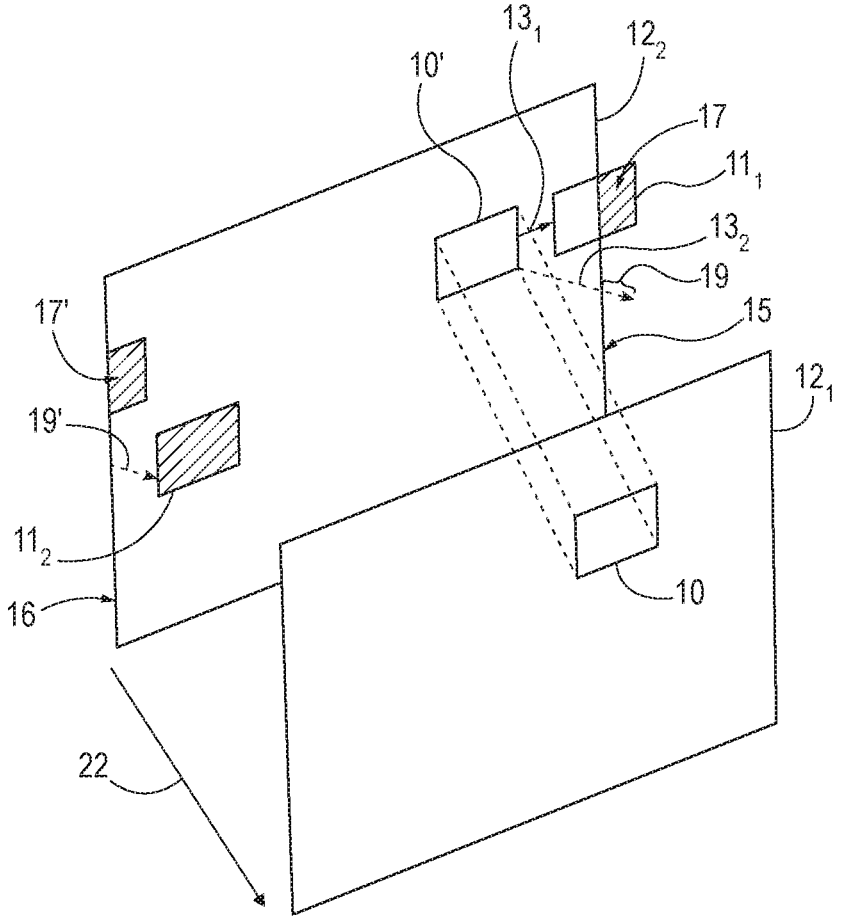
FIG. 5 illustrates a wrap-around motion compensation tool which may be applied in coding a picture.

FIG. 5 illustrates a wrap-around motion compensation tool which may be applied in coding a picture 12, e.g. picture A12 of FIG. 1. In FIG. 5, two pictures $12_1$ and $12_2$ are illustrated, which belong to different time stamps of presentation order 22. According to the scenario shown in FIG. 5, picture $12_1$ is coded using motion compensated temporal inter-prediction using picture $12_2$ as reference picture. To this end, a block 10 of picture $12_1$ is inter-predicted using a reference block 11 of reference picture $12_2$. As reference picture $12_2$ belongs to another, e.g. an earlier or a later, time frame than picture $12_1$, content may have moved within the reference picture with respect to picture $12_1$. Therefore, the reference block 11 may be shifted with respect to a collocated position 10' of block 10 within the reference picture $12_2$. A motion vector 13 is used to indicate the position of reference block 11 with respect to the collocated position 10' of block 10. In FIG. 5, two examples of a reference block 11 are illustrated, namely reference block $11_1$ the position of which is indicated by motion vector $13_1$, and reference block $11_2$ the position of which is indicated by motion vector $13_2$.

As illustrated in the example of the reference block $11_1$, the reference block may exceed a picture boundary, e.g. picture boundary 15, which in the example of FIG. 5 is a vertical picture boundary, but in general may be a picture boundary in a first direction of the picture plane. Similarly, as illustrated in the example of the motion vector $13_2$, the motion vector may exceed the picture boundary 15. The video, and hence the pictures $12_1$, $12_2$, may in examples represent a 360 degree view, i.e. the content of the pictures 12 covers, at least in a one direction of the picture plane, e.g. the horizontal direction, a 360 degree view. Thus, the content of the pictures at picture boundary 16, which is opposite to the picture boundary 15 and which is also oriented along the first direction, is a continuation of the content at the picture boundary 15 when considering a direction from the picture boundary 16 to the picture boundary 15. Thus, in case that the reference block $11_1$ exceeds the picture boundary 15, a portion 17 of the reference block $11_1$ exceeding the picture boundary may be mapped to a portion 17' of the reference picture $12_2$. The portion 17' is located within the reference picture $12_2$ at the opposite picture boundary 16. For example, the portion may have the same position with respect to the vertical direction, i.e., in general, the direction of the picture boundary 15, as the portion 17 of the reference block $11_1$. In other words, a wrap-around may be applied to the reference block $11_1$. Similarly, the motion vector $13_2$ exceeding the picture boundary 15 may be continued at the opposite picture boundary 16. That is, a portion 19 of the motion vector $13_2$ exceeding the picture boundary 15 may be mapped or translated to the opposite picture boundary 16, illustrated as mapped motion vector 19' in FIG. 5. The mapped motion vector 19' indicates the position of the reference block $11_2$. For example, the mapped motion vector 19' may be continued at a position of the opposite picture boundary 16 which has the same coordinate in the direction of the picture boundary 15 than the position at which the motion vector $13_2$ hits or intersects the picture boundary 15. The wrap-around of a reference block and/or a motion vector is referred to as wrap-around motion compensation tool.

In further examples, the first direction may be the horizontal direction. In further examples, the pictures 12 represent a 360 degree view in both, horizontal and vertical directions. In the latter case, wrap-around motion compensation may be applied to one or both directions, i.e. wrap-around motion compensation may be applied if the reference block and/or the motion vector exceeds a vertical picture boundary and/or a horizontal picture boundary. In the example of VVC, wrap-around motion compensation may be applied to the vertical picture boundary.

It is noted that in examples of 360 degree pictures, the view represented by the pictures 12, i.e. the picture content, may exceed 360 degree, what may be beneficial to avoid artefacts. In these cases, the above description of the wrap-around motion compensation may equivalently apply, wherein the picture boundary 15 represents, i.e. is to be understood as, a picture content boundary, and the opposite picture boundary 16 represents, i.e. is to be understood as, an opposite picture content boundary. In cases in which the view includes more than 360 degree, the picture content boundary and/or the opposite picture content boundary do not coincide with a boundary of the picture in terms of a border at which the sample array ends. However, in examples in which the pictures 12 represent exactly a 360 degree view, the picture content boundary and the opposite picture content boundary may coincide with a boundary of the picture in terms of a border at which the sample array ends, as illustrated in FIG. 5. In other words, the content of the picture 12 between the picture content boundary 15 and the opposite picture content boundary 16 may represent a 360 degree view. The picture content boundary and the opposite picture content boundary do not necessarily coincide with borders of the sample array of the picture.

Figure 6:
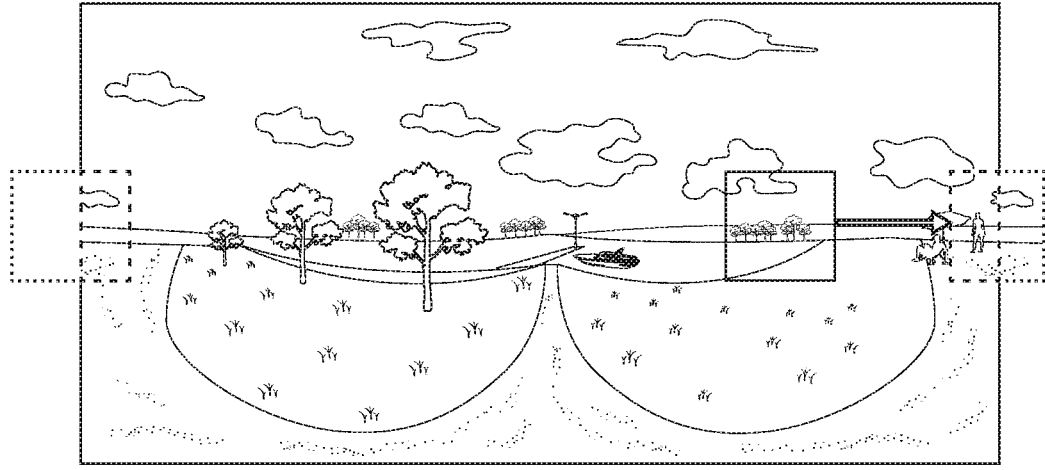
FIG. 6 illustrates an example of a picture representing a 360 degree view and wrap-around motion compensation where the position of a current block (solid line) and the position of its reference block (dashed lines) are depicted.

FIG. 6 illustrates an example of a picture 12 representing a 360 degree view and wrap-around motion compensation, as described in the introductory part of the description, which part is also to be understood as an example for wrap-around motion compensation as it may be implemented in example embodiments.

There are several use cases in which such a wrap-around motion compensation might be problematic. For instance, when consuming such a 360 video content, it is typically the case that the user does not frequently look to the poles of the sphere, i.e. to the top and bottom as most of the important content is likely located around the "equator" region. A quite useful way of saving some resources (sending less data over a channel or processing less data on the end device) would be to adapt to the viewers viewport (potentially using prediction) and adapting the amount of data sent or processed. One could imagine that at time instances when it is probable that the user will look at the poles (e.g. these regions depicting interesting features), the whole ERP is transmitted, while at other time instances when it is clear that the user will not look at the poles only a subset of the ERP is sent that excludes the poles.

The problem that is encountered in such a case is that the wraparound tool is activated when indicated in a PPS and when the "format" of the current picture and the reference picture is the same, i.e. same picture size, same scaling window. This means that whenever such a picture format change happens as a result of adapting the portion of the ERP picture that is sent, the wraparound needs to be activated or deactivated accordingly. When the encoder is in the streaming loop, i.e., the encoder gets feedback from the viewer and it is aware of what is currently sent to the user, this can be simply applied at the encoder-side and this on/off tool control can happen when necessary at the encoding stage.

Figure 7:
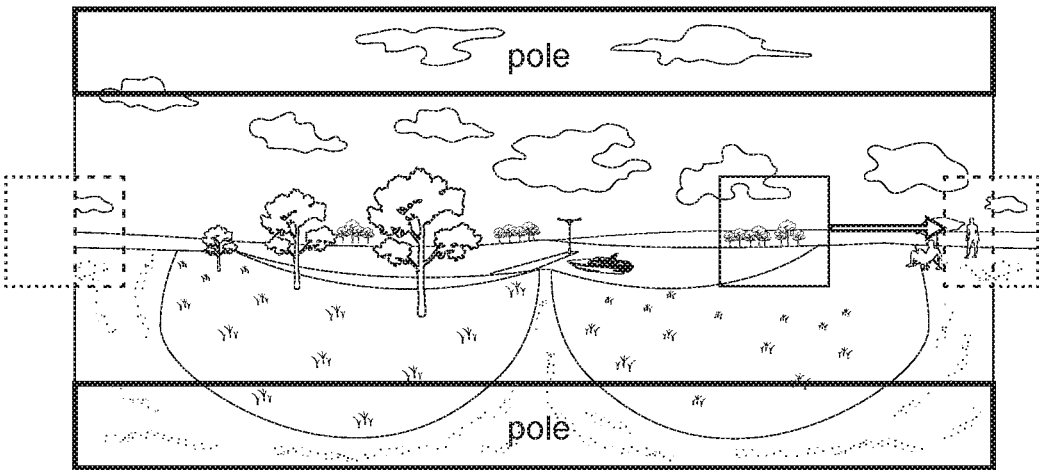
FIG. 7 illustrates an example encoding relating to the picture in FIG. 6.

However, the same approach could be carried out without the encoder being in the streaming loop. In such a case, one could for instance envision that the encoder encodes the ERP using 3 subpictures, one for each of the areas illustrated in FIG. 7. I.e., in that example, 2 subpictures for the two poles and one subpicture for the equator of the ERP picture. In such a case, the encoder would not be aware of when the whole 360 ERP is sent and when only the equator part. For an intermediate device to be aware of when the adaptation can be performed, it would be essential to be aware of when the wraparound tool is used and where not so that picture not using wraparound could be used for switching from sending the whole ERP to only the equator or vice-versa. Therefore, in one embodiment signalling is provided in the bitstream that indicates that a picture is a potential switching point that allows changing from one picture format (i.e. picture size with a particular scaling window defined) to another one since it is not using wraparound and no picture following in coding order will use wraparound motion compensated prediction using a reference picture preceding the switching point. In streaming scenarios such a picture may be a CRA picture together with a its associated RASL pictures, i.e. the CRA pictures naturally does not use any motion compensated prediction and all or certain RASL pictures are constrained to not use wrap around motion compensation in order to allow conformant switching.

In an even more sophisticated scenario, viewport-adaptation in steaming such 360-degree video content is carried out by offering individual high-quality/high-resolution tiles from a mosaic of the content to the client which then selects the portion of the content to be downloaded according to its current (or predicted future) viewport. In such a case, a full-360-degree fallback tile is typically included in the offering so that clients can show a least a low-quality version of content that is not within the clients selection of high-quality tiles in case the user performs a sudden, unexpected or non-predicted change of viewing direction and the client is not able to download appropriate high-quality content in time. In such a scenario, clients typically combine the individual bitstream of all downloaded tiles into a single compressed bitstream to feed it into a decoder. An example of such a combined bitstream and the varying tile selection (switching from two to three high-quality tiles while maintaining one low-quality fallback tile) is given in FIG. 8.

Figure 8:
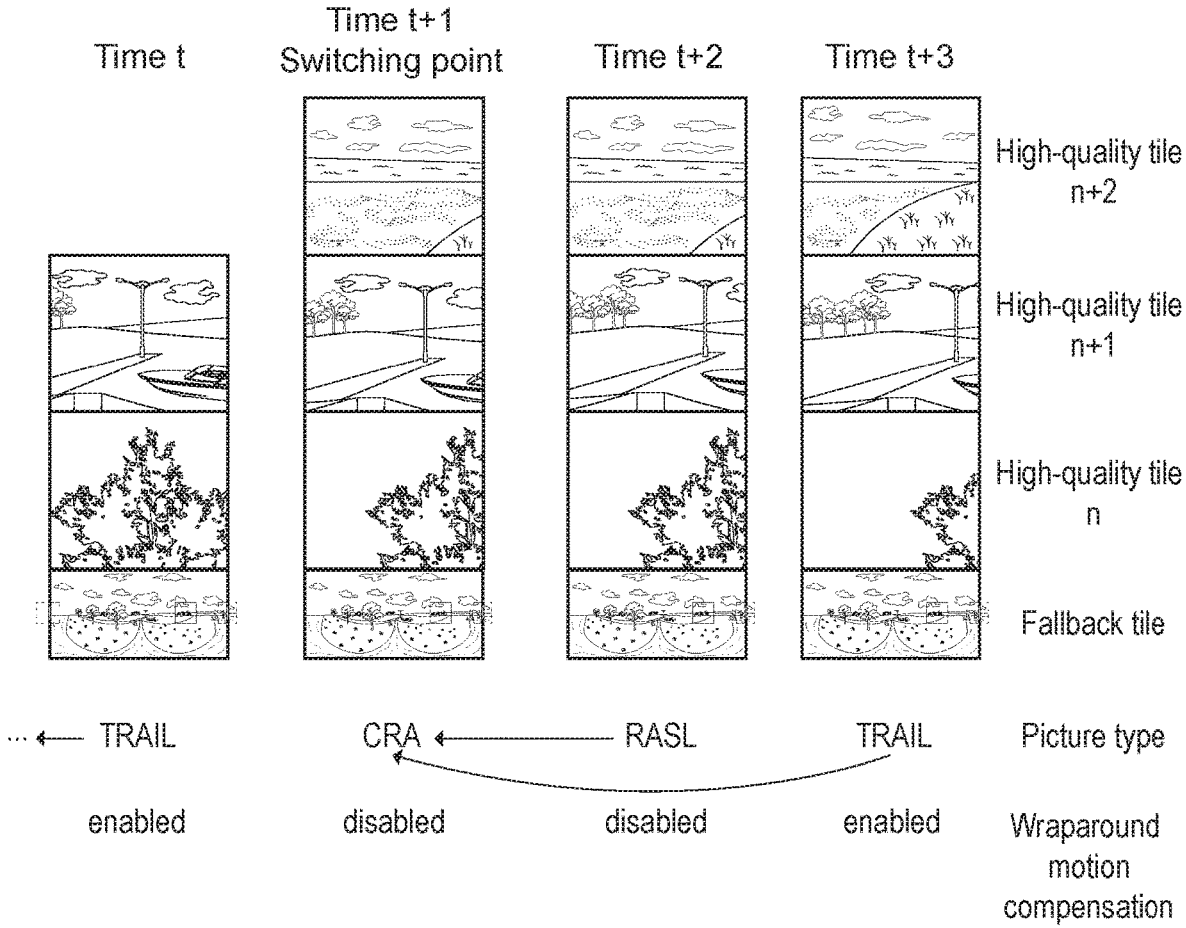
FIG. 8 illustrates an example of tile-based viewport adaptive streaming with temporally varying number of high-quality tiles and one low quality fall-back tile at the bottom.

FIG. 8 illustrates an example of tile-based viewport adaptive streaming with temporally varying number of high-quality tiles and one low quality fall-back tile at the bottom. There are various reasons for which the number of downloaded high-quality tiles on client side in such a setup may change over time as depicted in FIG. 8 time instance t+1. For instance, the client viewport corresponds to a varying number of tiles depending on viewing direction and projection characteristics. Further, a viewport prediction on client side may vary in accuracy over time requiring more over-provisioning in terms of downloaded high-quality portion of the 360-degree video. Even further, knowledge of the content characteristics may allow a client to identify potentially interesting content areas at a particular time and download the corresponding high-quality tiles. For all these reasons, a change of the amount of downloaded high-quality tiles may occur and therefore, the picture resolution may change. While it is advantageous in such a scenario to encode the full-360-degree fallback tile using wraparound motion compensation for the purpose of a higher coding efficiency, it is necessary for wraparound motion compensation to be completely disabled at certain pictures (switching point in in FIG. 8) of the combined bitstream in order to perform a change of the number of downloaded high-quality tiles over time while maintaining a conformant bitstream.

Another case, that requires some additional information for using wraparound efficiently is resolution switching in HTTP streaming of general video content, as will be described making reference to FIG. 4. In HTTP streaming, it is common that the same video content is encoded, segmented and offered in various bitrates and resolutions to either serve clients with diverse capabilities or allow client-side adaptation of the downloaded bitstream to the observed throughput, changes in the content presentation on client side such as fullscreen vs windowed display, changes in user-to-display distance, changes in ambient light environment. Clients can continuously switch between variants of segments during the streaming session and generate a concatenated bitstream to be fed to a decoder. When open group of pictures (GOP) coding structures are used, i.e. random access point (RAP) pictures have leading pictures (e.g. RASL pictures in VVC) that use pictures preceding the RAP picture as reference picture for prediction, the coding efficiency is generally increased but switching between segment variants leads to the fact that the leading pictures may use a different variant of a reference pictures of an earlier segment than was originally used when encoding the segment. This segment variant containing the reference picture may have, for instance, a different resolution than the segment containing the leading picture, in which case the concatenated client-side bitstream should indicate usage of a technique referred to reference picture resampling (RPR) for the decoder to generate reference pictures with matching resolution. FIG. 4 shows an example of such a situation by depicting the pictures and prediction dependencies in the bitstream formed from two consecutive segments in a streaming session where the first segment is a closed GOP structure without references to earlier segments and the second segments contains RASL pictures with references to the earlier segment.

As it is vital to indicate in the bitstream that the encoder obeyed certain constraints when encoding the bitstream so as to allow such bitstream switching operation (e.g. adapting resolution), appropriate constraint signalling was first proposed in JVET-V0060 and JVET-W0133 and was integrated into VVC version 2 draft as the so-called Constrained RASL encoding indication SEI message.

However, a remaining problem is that, according to the state-of-the-art design of this signalling, the associated constraints do not preclude use of wrap-around motion compensation for leading pictures in the bitstream, e.g. for the purpose of encoding the RASL pictures more efficiently compared to not using wrap-around motion compensation. However, when a client would try to perform resolution switching in a streaming session with at segment boundaries (e.g. starting with RAP pictures with such inadequately constrained leading pictures), an illegal non-conformant bitstream would be generated as wrap around motion compensation and RPR cannot be utilized in the same coded picture in VVC.

Figure 9:
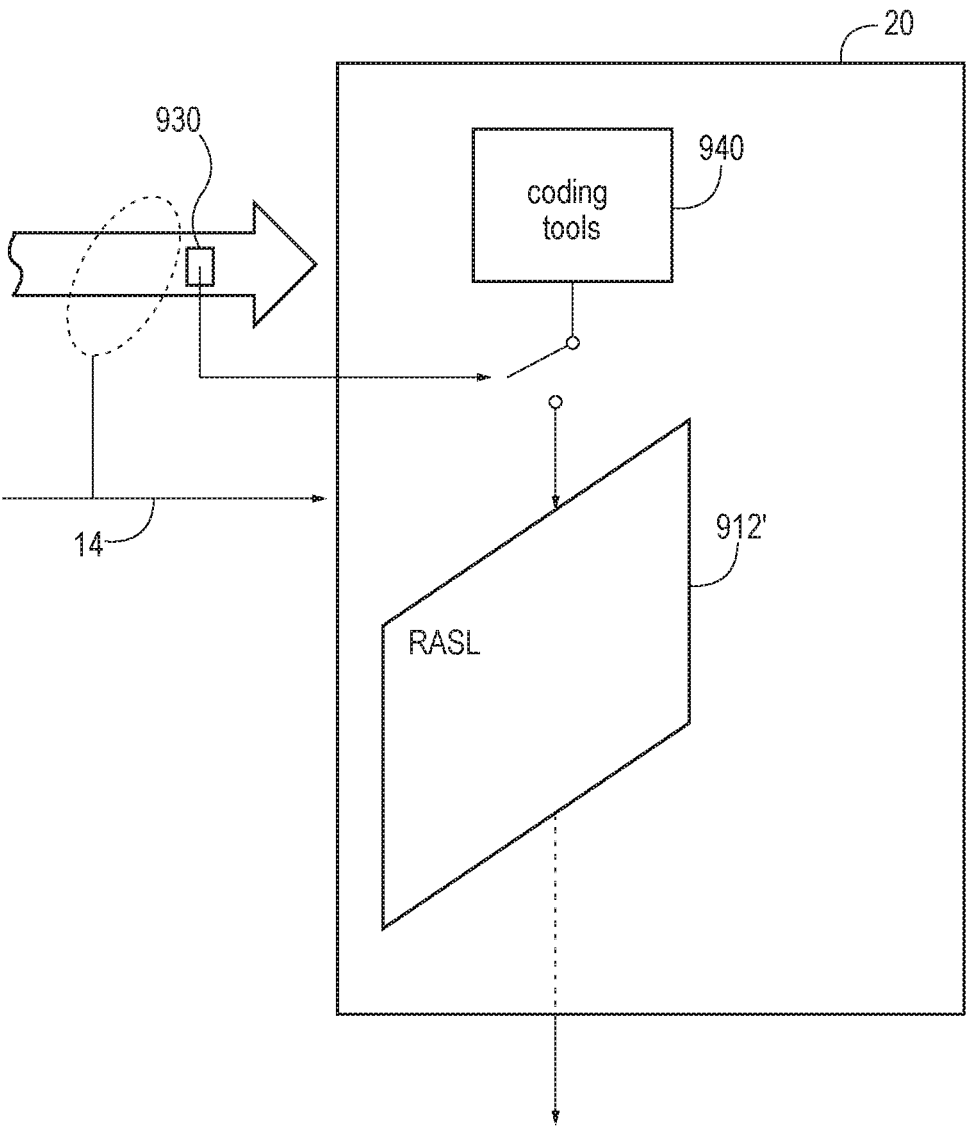
FIG. 9 illustrates a video decoder according to an example embodiment.

FIG. 9 illustrates a video decoder 20 according to an embodiment. E.g., decoder 20 may be implemented as decoder A20 of FIG. 2. Decoder 20 decodes pictures of a video from data stream 14. Decoder 20 according to FIG. 9 is configured for decoding an indication 930 from the data stream 14. The indication 930 is valid for a sequence of pictures, e.g. a CVS as described with respect to FIG. 4. If present, in the data stream, the indication 930 indicates that certain RASL pictures 912' or all RASL pictures 912' of the sequence of picture to which the indication refers are coded in a manner excluding a predetermined set 940 of one or more coding tools. The predetermined set 940 includes a wrap-around motion compensation tool, e.g. as described before.

As explained before, a RASL picture (such as picture of coding order 10 in FIG. 4) may include a temporal inter-prediction reference to a picture (e.g. coding order 1 in FIG. 4) preceding a CRA picture to which a RASL picture is associated (CRA picture of coding order 9 in FIG. 4) in coding order. The pictures preceding the associated CRA pictures may belong to a previous segment, and hence, may have a picture format, e.g. one or more of picture size, scaling window, resolution, as described with respect to the scenarios of FIG. 4 to FIG. 8. The inventors realized, that the combination of wrap-around motion compensation and reference picture rescaling in bitstreams allows for higher coding efficiency but could under certain conditions and at certain pictures result in illegal bitstreams, e.g. when stream switching occurs in HTTP streaming or a middle box decides to drop portions of the bitstream. Therefore, in order to allow switching between different representations, or in order to guarantee a conformant bitstream, e.g. in the above described scenarios of varying quality of different portions of a 360 degree video, it is beneficial to deactivate the wrap-around motion compensation tool.

For example, decoder 20 supports the motion compensated temporal inter-prediction as described with respect to FIG. 5, and may use, in applying the motion compensated temporal inter-prediction, the wrap-around motion compensation tool, e.g. in case that the data stream 14 represents a 360 degree video as described with respect to FIG. 5 to FIG. 8.

According to an embodiment, the indication 940 is part of a supplemental enhancement information (SEI) message in the data stream 14, or is represented by the presence of a specific SEI message in the data stream. For example, the indication 940 is represented by the presence of a constrained RASL encoding indication (CREI) SEI message for the sequence of pictures. That is, decoder may deactivate the coding tools of the predetermined set 940 for certain or all RASL pictures, if a CREI SEI message is present in the data stream 14 for the sequence of pictures.

Accordingly, in a first embodiment, the indication 930 indicates that all RASL pictures of the sequence of picture to which the indication refers are coded in a manner excluding the predetermined set 940 of one or more coding tools.

In other words, one aspect is to indicate in the bitstream, that RASL pictures do not use wrap around motion compensation. For example, this indication can be in in addition to the state-of-the art version of the constrained RASL encoding indication SEI message. In other words, according to embodiments implemented in VVC, the CREI SEI message is used as indication 940.

Table 1 shows an embodiment based on the Constrained RASL encoding indication SEI message, the last item represents such a constraint:

TABLE 1

| | Descriptor |
| --- | --- |
| constrained_rasl_encoding_indication( payloadSize ) { | |
| } | |
| [...] | |

The presence of the CREI SEI message indicates that the following conditions all apply for each RASL picture in the CVS:

The PH syntax structure has ph_dmvr_disabled_flag equal to 1.

No CU in a slice with sh_slice_type equal to 0 (B) or 1 (P) has cclm_mode_flag equal to 1.

No collocated reference picture precedes the CRA picture associated with the RASL picture in decoding order.

No picture parameter set (PPS) referred to by the RASL picture has pps_ref_wraparound_enabled_flag equal to 1 (i.e. wrap-around motion compensation is not enabled for that RASL picture).

According to a second embodiment, the indication 930 indicates that certain RASL pictures of the sequence of picture to which the indication refers are coded in a manner excluding the predetermined set 940 of one or more coding tools. In one embodiment, the certain RASL pictures include all RASL pictures which have a CRA picture, preceding the respective picture in coding order, as a direct reference picture.

In other words, the above constraint may be more restrictive than actually required. There might be RASL pictures that do not depend on any picture preceding the CRA in decoding order and therefore such RASL pictures would not use as reference any picture with a different format (see for instance picture with coding order 15). Therefore, in another second embodiment the constraint described above only applies to RASL pictures that have an active reference preceding the CRA.

Figure 10:
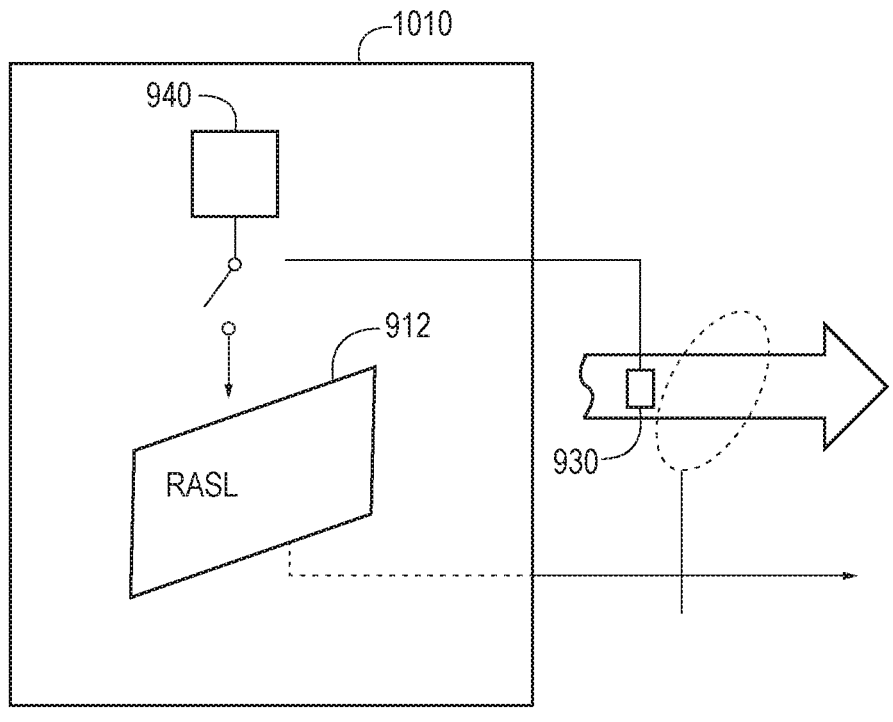
FIG. 10 illustrates an encoder for encoding video into a data stream.

FIG. 10 illustrates an encoder 1010 for encoding a video into a data stream 14. For example, encoder 1010 may be implemented as encoder A10 of FIG. 1. Encoder 1010 encodes the indication 930 as described with respect to FIG. 9 into the data stream 14.

In other words, encoder 1010 provides the indication 930 to decoder 20. Thus, the indication 930 represent a promise for decoder 20 that the RASL pictures 912 are encoded without the coding tools of the predetermined set 940.

In fact, the above second embodiment is still more restrictive than necessary and could have a negative impact on coding efficiency. Note for instance the picture in FIG. 4 with coding order 10. Such a picture has two reference pictures, one being the CRA and the other a picture that precedes the CRA in coding order. Actually, when motion compensation is applied with the CRA as a reference, wraparound could be used, since the picture format is the same. And when motion compensation is applied with the picture preceding the CRA in coding order wraparound should be avoided. Since the on/off mechanism available in the VVC specification is not a per reference picture signalling but applies to all reference pictures of a particular picture associated to a PPS that carries the signalling, it is not possible to activate wraparound motion compensation for each reference picture. Therefore, in another third embodiment, as a further alternative, instead of requiring turning off wraparound motion compensation by setting the control flag in PPS to 0 for some pictures (e.g. RASLs in the example for resolution switching in HTTP or for the so-called switching points in the example with subpictures further above), the encoder could restrict the MVs per CU and make sure that even when wraparound is activated no MV points outside the picture area that would trigger wraparound when the current picture and the reference picture has a different picture format.

Thus, according to an embodiment, encoder 1010 does not necessarily include the indication 930 in the data stream 14, but rather, in applying motion compensated inter-prediction to the RASL picture 912, restricts the choice of motion vectors to those which do not result in a reference block exceeding a picture boundary.

According to embodiments, the decoder 20 and encoder 1010 support reference picture resampling (RSR), e.g. as described in the introductory part.

RSR may include a resampling of samples of a a reference picture of an inter-predicted block, so as to bridge a scaling window size deviation or sample resolution deviation between the reference picture and the picture in which the inter-predicted block is contained to provide an inter-prediction signal for the inter-predicted block. That is, according to RSR, scaling windows and/or resolutions of the currently coded picture $12_1$, or a block 10 thereof, and of the reference picture $12_2$ used for inter-prediction, or the reference block 11 thereof, may be adapted to each other, e.g. by resampling the reference picture or the reference block.

According to embodiments, the predetermined set 940 further includes a cross-component linear-model (CCLM) based prediction tool and/or a a decoder-side motion vector refinement tool, cf., e.g. the above embodiment of Table 1, according to which the predetermined set 940 includes both of these tools. Implementation examples of the CCLM tool is described in the following.

Cross Component Linear Model (CCLM) that allows to intra-predict the chroma components of a block from the respective luma component using a linear model wherein model parameters are derived from the reconstructed luma sample values. The linear model transforms subsampled luma-samples $rec'_L$ into chroma prediction by the means of the following:

$$P(i, j) = a \cdot rec'_L(i, j) + b,$$

where the parameters a and b are derived from neighboring luma and chroma samples as follows. With $X_l$ and $X_s$ denoting the average of the two largest and the two smallest neighboring samples, respectively, and $Y_l$ and $Y_s$ denoting the average of the corresponding chroma sample pairs, respectively, the parameters are derived as:

$$a = (Y_l - Y_s)/(X_l - X_s)$$

$$b = Y_s - a \cdot X_s$$

Due to the parameter derivation process only accounting for the extrema of the neighboring samples values, the process is prone to extensive drift even in case of single-sample drift outliers in the neighboring blocks. Also, because of the linear model, if a is large, the luma drift might become amplified. For other intra-prediction modes, which account for all of the neighboring sample values, the drift propagation is much less apparent, and cannot be linearly amplified. Due to this inherent instability this mode needs special care when applied in applications where constrained drift is acceptable, as open GOP switching in HTTP adaptive streaming. On top of this, since in the context of the described application, the drift can only occur in RASL fames, i.e. motion predicted frames. If the encoder decides to use CCLM, i.e. an intra prediction mode, this would usually be due to a lack of an appropriate motion compensated predictor, implying a region of high temporal activity. In such regions the expected reconstruction drift for open GOP switching is expected to be high, contributing even more to the discussed instability effect.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet. In other words, further embodiments provide a video bitstream product including the video bitstream according to any of the herein described embodiments, e.g. a digital storage medium having stored thereon the video bitstream.

Depending on certain implementation requirements, embodiments can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments comprise a data carrier having electronically readable control signals, which are capable of cooperating with a programmable computer system, such that one of the methods described herein is performed.

Generally, embodiments can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processor, for example a computer, or a programmable logic device, configured to or adapted to perform one of the methods described herein.

A further embodiment comprises a computer having installed thereon the computer program for performing one of the methods described herein.

A further embodiment comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

DOCUMENTS INCORPORATED HEREIN BY REFERENCE

[1] ISO/IEC JTC 1, Information technology—Dynamic adaptive streaming over HTTP (DASH)—Part 1: Media presentation description and segment formats, ISO/IEC 23009-1, 2012 (and subsequent editions).

[2] J. De Cock, Z. Li, M. Manohara, A. Aaron. "Complexity-based consistent-quality encoding in the cloud." 2016 IEEE International Conference on Image Processing (ICIP). IEEE, 2016

[3] DASH Industry Forum Implementation Guidelines. [Online]. Available: https://dashif.org/guidelines/

[4] ITU-T and ISO/IEC JTC 1, Advanced Video Coding for generic audio-visual services, Rec. ITU-T H.264 and ISO/IEC 14496-10 (AVC), May 2003 (and subsequent editions).

[5] ITU-T and ISO/IEC JTC 1, "High Efficiency Video Coding," Rec. ITU-T H.265 and ISO/IEC 23008-2 (HEVC), April 2013 (and subsequent editions).

[6] Y. Yan, M. Hannuksela, and H. Li. "Seamless switching of H. 265/HEVC-coded dash representations with open GOP prediction structure." 2015 IEEE International Conference on Image Processing (ICIP). IEEE, 2015.

[7] ITU-T and ISO/IEC JTC 1, "Versatile video coding", Rec. ITU-T H.266 and ISO/IEC 23090-3 (VVC), August 2020.

[8] V. Baroncini and M. Wien, "VVC verification test report for UHD SDR video content", doc. JVET-T2020 of ITU-T/ISO/IEC Joint Video Experts Team (JVET), 21th meeting: October 2020.

[9] D. Luo, V. Seregin, W. Wan. "Description of Core Experiment 1 (CE1): Reference picture resampling filters", doc. JVET-Q2021 of ITU-T/ISO/IEC Joint Video Experts Team (JVET), 15th meeting: July 2019

[10] H. Schwarz, D. Marpe, and T. Wiegand, "Analysis of hierarchical B pictures and MCTF", ICME 2006, IEEE International Conference on Multimedia and Expo, Toronto, Ontario, Canada, July 2006.

[11] Y.-K. Wang et al., "The High-Level Syntax of the Versatile Video Coding (VVC) Standard" IEEE Trans. Circuits Syst. Video Technol., in press

[12] H. Yang et al., "Subblock based Motion Derivation and Inter-Prediction Refinement in Versatile Video Coding Standard", IEEE Trans. Circuits Syst. Video Technol., in press

[13] W.-J. Chien et al., "Motion Vector Coding and Block Merging in Versatile Video Coding Standard", IEEE Trans. Circuits Syst. Video Technol., in press

The invention claimed is:

1. A video decoder comprising at least one processor, the at least one processor configured to:
decode a supplemental enhancement information (SEI) message from a data stream, the SEI message indicating that coding of all random access skipped leading (RASL) pictures within a sequence of pictures is constrained in a manner excluding a predetermined set of one or more coding tools, the predetermined set including
a wrap-around motion compensation tool,
the sequence of pictures comprising at least one RASL picture and a clean random access (CRA) picture associated with the at least one RASL picture.

2. The video decoder of claim 1, wherein the wrap-around motion compensation tool is a horizontal wrap-around motion compensation tool.

3. The video decoder of claim 1, wherein, according to the wrap-around motion compensation tool, if a portion of a reference block indicated by a motion vector for motion compensated temporal inter-prediction exceeds a picture content boundary of a reference picture, the portion of the reference block exceeding the picture content boundary is mapped to a portion of the reference picture which is positioned at an opposite picture content boundary, and/or a portion of the motion vector exceeding the picture content boundary is continued at the opposite picture content boundary.

4. The video decoder of claim 1, wherein the at least one processor is configured to support reference picture resampling.

5. The video decoder of claim 4, wherein, according to the reference picture resampling, a reference picture of an inter-predicted block is subject to sample re-sampling so as to bridge a scaling window size deviation or sample resolution deviation between the reference picture and a picture in which the inter-predicted block is contained to provide an inter-prediction signal for the inter-predicted block.

6. The video decoder of claim 1, wherein the sequence of pictures comprises pictures which are consecutive in coding order, and wherein the sequence of pictures starts, in coding order, with the CRA picture.

7. The video decoder of claim 1, wherein the predetermined set of one or more coding tools further comprises a cross-component linear-model based prediction tool and a decoder-side motion vector refinement tool.

8. A video encoder comprising at least one processor, the at least one processor configured to:
encode a supplemental enhancement information (SEI) message into a data stream, the SEI message indicating that coding of all random access skipped leading (RASL) pictures within a sequence of pictures is constrained in a manner excluding a predetermined set of one or more coding tools, the predetermined set including
a wrap-around motion compensation tool,
the sequence of pictures comprising at least one RASL picture and a clean random access (CRA) picture associated with the at least one RASL picture.

9. The video encoder of claim 8, wherein the wrap-around motion compensation tool is a horizontal wrap-around motion compensation tool.

10. The video encoder of claim 8, wherein, according to the wrap-around motion compensation tool, if a portion of a reference block indicated by a motion vector for motion compensated temporal inter-prediction exceeds a picture content boundary of a reference picture, the portion of the reference block exceeding the picture content boundary is mapped to a portion of the reference picture which is positioned at an opposite picture content boundary, and/or a portion of the motion vector exceeding the picture content boundary is continued at the opposite picture content boundary.

11. The video encoder of claim 8, wherein the at least one processor is configured to support reference picture resampling.

12. The video encoder of claim 11, wherein, according to the reference picture resampling, a reference picture of an inter-predicted block is subject to sample re-sampling so as to bridge a scaling window size deviation or sample resolution deviation between the reference picture and a picture in which the inter-predicted block is contained to provide an inter-prediction signal for the inter-predicted block.

13. The video encoder of claim 8, wherein the sequence of pictures comprises pictures which are consecutive in coding order, and wherein the sequence of pictures starts, in coding order, with the CRA picture.

14. The video encoder of claim 8, wherein the set of one or more coding tools further comprises a cross-component linear-model based prediction tool and a decoder-side motion vector refinement tool.

15. A method of video decoding, the method comprising:
decoding a supplemental enhancement information (SEI) message from a data stream, the SEI message indicating that coding of all random access skipped leading (RASL) pictures within a sequence of pictures is constrained in a manner excluding a predetermined set of one or more coding tools, the predetermined set including
a wrap-around motion compensation tool,
the sequence of pictures comprising at least one RASL picture and a clean random access (CRA) picture associated with the at least one RASL picture.

16. A method of video encoding, the method comprising:

encoding a supplemental enhancement information (SEI) message into a data stream, the SEI message indicating that coding of all random access skipped leading (RASL) pictures within a sequence of pictures is constrained in a manner excluding a predetermined set of one or more coding tools, the predetermined set comprising a wrap-around motion compensation tool, the sequence of pictures comprising at least one RASL picture and a clean random access (CRA) picture associated with the at least one RASL picture.

\* \* \* \* \*